(12) United States Patent
Stoll et al.

(10) Patent No.: US 11,225,004 B2
(45) Date of Patent: Jan. 18, 2022

(54) ACTUATING DEVICE FOR ADJUSTING AT LEAST ONE VALVE NEEDLE OF AN INJECTION MOLDING APPARATUS

(71) Applicant: Otto Männer GmbH, Bahlingen (DE)

(72) Inventors: Benedikt Stoll, Bötzingen (DE); Marco Herdel, Ihringen (DE); Alexander Gehring, Bötzingen (DE)

(73) Assignee: OTTO MÄNNER GMBH, Bahlingen (DE)

(*) Notice: Subject to any disclaimer, the term of this patent is extended or adjusted under 35 U.S.C. 154(b) by 591 days.

(21) Appl. No.: 15/997,242

(22) Filed: Jun. 4, 2018

(65) Prior Publication Data

US 2018/0345553 A1 Dec. 6, 2018

(30) Foreign Application Priority Data

Jun. 2, 2017 (DE) .......................... 102017005299.9

(51) Int. Cl.
*B29C 45/33* (2006.01)
*B29C 45/28* (2006.01)

(52) U.S. Cl.
CPC .... *B29C 45/281* (2013.01); *B29C 2045/2813* (2013.01); *B29C 2045/2824* (2013.01)

(58) Field of Classification Search
CPC .......... B29C 45/281; B29C 2045/2813; B29C 45/1603; B29C 2045/2824; B29C 45/231; B29C 45/2735
See application file for complete search history.

(56) References Cited

U.S. PATENT DOCUMENTS

| 6,113,381 | A | * | 9/2000 | Gellert | ............... B29C 45/1603 264/328.9 |
|---|---|---|---|---|---|
| 2009/0100962 | A1 | * | 4/2009 | Uracz | ................... B29C 45/281 74/567 |
| 2015/0014887 | A1 | * | 1/2015 | Keitel | ................ B29C 45/2725 264/328.8 |
| 2015/0110917 | A1 | | 4/2015 | Belzile | |

FOREIGN PATENT DOCUMENTS

| EP | 1 025 974 A2 | 8/2000 |
|---|---|---|
| EP | 2 217 099 A1 | 8/2010 |
| JP | 2011-183741 A | 9/2011 |
| WO | WO 2009/055100 A1 | 4/2009 |
| WO | WO 2013/127524 A1 | 9/2013 |

* cited by examiner

*Primary Examiner* — Nahida Sultana
*Assistant Examiner* — Debjani Roy
(74) *Attorney, Agent, or Firm* — Pauley Erickson & Swanson

(57) ABSTRACT

An actuating device for adjusting at least one valve needle of an injection molding apparatus with a hot runner manifold that has disposed thereon at least one hot runner nozzle with at least one valve needle extending there-through which may control the melt flow through the hot runner nozzle. The actuating device has a support plate that is connected to the at least one valve needle and movable in a first direction relative to the hot runner manifold. The actuating device further includes a reciprocating device for moving the support plate in the first direction relative to the hot runner manifold, wherein the reciprocating device includes a slider mechanism and an actuation drive that is connected to a trigger device for generating a linear motion, wherein the slider mechanism has at least one thrust rod that is disposed in a second direction at an angle relative to the first direction.

14 Claims, 5 Drawing Sheets

ACTUATING DEVICE FOR ADJUSTING AT LEAST ONE VALVE NEEDLE OF AN INJECTION MOLDING APPARATUS

CROSS-REFERENCE TO RELATED APPLICATIONS

This application claims benefit of priority from German Patent (DE) Application No. 102017005299.9, filed Jun. 2, 2017, which is herein incorporated by reference in its entirety.

TECHNICAL FIELD

The disclosure relates to an actuating device for adjusting at least one valve needle of an injection molding apparatus having a hot runner manifold with at least one hot runner nozzle that is disposed thereon and through which extends at least one valve needle by which the melt flow through the hot runner nozzle is controllable.

BACKGROUND

Actuating devices are known in the art. For example, international patent application WO 2013/127524 describes a reciprocating device for moving the support plate in the axial direction of the valve needles having a first rotating element that is rotatably supported about a first axis and a second rotating element that is rotatably supported about a second axis parallel to the first axis, wherein the first rotating element is in a drive connection with the support plate via a first motion transformation device having at least one first sloping surface, and the second rotating element is in a drive connection with the support plate via a second motion transformation device having at least one second sloping surface. A slider mechanism is also in a drive connection with the actuating drive having a first thrust rod and a second thrust rod, whereby the latter is disposed in parallel and at a distance relative to the former, whereby both rods are connected with each other and disposed at the holding means, movable back and forth in a sliding direction oriented transversely relative to the axial direction of the valve needles, and wherein the first thrust rod is in a drive connection with the first rotating element, and the second thrust rod is in a drive connection with the second rotating element. An actuating device of this kind requires a large installation space, involves great complexity in terms of manufacturing and assembly, and it is expensive with complex maintenance requirements because of the substantial number of components.

European Patent EP 1 025 974 proposes a less complex, more compact solution, wherein cam elements are disposed laterally on the support plate of the valve needle and guided in diagonally extending grooves of an actuation mechanism, wherein a movement by the actuation mechanism results in a movement of the support plate of the valve needle in the axial direction of the valve needles. Disadvantageously, the cam elements are guided without static specificity; only forces that act in the axial direction of the valve needles are transferable.

Another less complex, more compact solution is described in European Patent EP 2 217 099, where the lateral elements are not guided via sliding friction but by means of guide rollers to avoid the disadvantageous static friction effects described in the solution described above. However, this results in the additional disadvantage of a large reverse clearance with an associated loss of precision when operating the valve needles.

The great forces that are needed in the axial direction of the valve needles are a further challenge when actuating a support plate that is fixedly connected to the valve needles. Once the support plate is actuated by means of the actuation device, these forces generate torques relative to the support plate, particularly if the force is unevenly distributed. Any associated distortion and/or bending of the support plate results in a loss of precision concerning the desired parallel actuation of the valve needles.

There is therefore a need to provide an actuating device for adjusting at least one valve needle of an injection molding apparatus that will improve upon the above-described disadvantages.

SUMMARY

According to one aspect of the present disclosure, this need may be met by an actuating device for adjusting at least one valve needle of an injection molding apparatus. The injection molding apparatus includes a hot runner manifold with at least one hot runner nozzle that is disposed thereon, and through which extends at least one valve needle by which the melt flow through the hot runner nozzle is controllable.

The actuating device includes a support plate that is connected to at least one valve needle and movable back and forth in a first direction relative to the hot runner manifold, which is parallel relative to the actuation direction of the valve needles. Furthermore, the actuating device includes a reciprocating device for sliding the support plate in the first direction relative to the hot runner manifold, wherein the reciprocating device includes a slider mechanism and an actuation drive that is connected to the trigger device for generating a linear movement.

The slider mechanism includes at least one thrust rod that is disposed, specifically, at a distance relative to the support plate. The thrust rod is positioned with a backward and forward sliding capability in a second direction, which is at an angle relative to the first direction.

According to one aspect of the present disclosure, the at least one thrust rod has at least one thrust element with a thrust element guide that is angled relative to the second direction, wherein the thrust element guide includes at least two sloped guide surfaces. A first slider element with a first slider element guide is disposed in the area of each thrust element on the support plate, which is, corresponding to the thrust element guide, disposed at an angle relative to the second direction having at least two guide surfaces that are sloped according to the guide surfaces of the thrust element guide. The thrust element and the first slider element are movable relative to each other along the respective guide surfaces. The slope of the guide surfaces therein is configured such that forces can be transferred via the respective guides that are in effect in a first direction and in a third direction, which is transverse relative to the first and second directions, as well as the torques acting on the support plate. In this configuration, one thrust element each will act in conjunction with a first slider element, whereby a movement of the thrust rod in the second direction will result in a movement of the support plate in the first direction.

The third direction is arranged transversely relative to the first direction and the second direction; it is arranged substantially orthogonal relative to the first direction and the second direction. The actuation direction of the valve needles does not match the axial direction of the valve needles in each possible embodiment because, with the proposed actuating devices, valve needles of hot runner nozzles can also be actuated, whose at least one valve needle is disposed at an angle relative to the actuation direction thereof, such as is the case, for example, with hot runner nozzles with lateral casting.

Aside from the slider mechanism, the reciprocating device further includes an actuation drive connected to the trigger device for generating a linear motion. The actuation drive therein can follow any expedient drive concept, such as, for example, an electrical drive system in form of a servomotor. Depending on the circumstances and the purpose of use, the actuation drive can also be designed as a hydraulically or pneumatically powered drive motor. The actuation drive is connected to a trigger device, which is, e.g., connected to the machine control system or integrated with the same to control the valve opening times of the injection molding machine during the injection molding process and thereby the melt flow through the hot runner nozzle.

Each thrust rod includes at least one thrust element that can be configured as one piece with the thrust rod or connected to the thrust rod.

The presently proposed guide includes at least two sloped guide surfaces. The guide is particularly a linear guide, whose guide surfaces are configured as sloped relative to the longitudinal direction, specifically in such a manner that the guide surfaces together enclose an angle of inclination in the manner of a "pitched roof profile." This way, a slider element is movably disposed on the thrust element in the longitudinal direction of the guide surfaces of the slider element and the thrust element. The forces and/or force components and torques that act in a direction other than the longitudinal direction (second direction) are at least partially absorbed by the sloped guide surfaces, particularly in the first direction, and thereby parallel relative to the actuation direction of the valve needles, also in a transverse direction thereto, acting rather laterally upon the support plate.

The slope of the guide surfaces is configured such that forces and torques can be absorbed by the respective guide; these are forces and torques that act along the first direction and in a third direction, which is substantially orthogonal and/or transverse relative to the first direction and the second direction. Because the second direction can be arranged at a different angle than a 90-degree-angle relative to the first direction, it is possible to conceive embodiments where the third direction has a substantially orthogonal orientation relative to the first direction and the second direction, although the first direction and the second direction, in contrast, are not arranged as substantially orthogonal relative to each other.

This way, the proposed slider mechanism helps stabilize the support plate and provides precise valve needle motion. This is particularly advantageous for the torques that act on the support plate possibly resulting in a deflection and/or distortion or arcing of the support plate, thereby impairing the precision of the parallel actuation of all the valve needles that are disposed on the support plate, and thereby impacting the parallel filling action of the injection mold cavities. This way, the forces acting in the third direction can be absorbed very nicely by column guides, which are usually provided on injection molding apparatuses, without compromising the precision of the support plate actuation. Forces and/or torques that are in effect particularly in a direction that is angled relative to the third direction, which may favor a non-symmetrical support plate motion and/or plate distortion, are absorbed only partially by known guide concepts. The proposed solution facilitates the absorption of such forces and/or torques via the slider mechanism and thereby enables a more even and more precise adjusting motion of the support plate. Due to the improved force and torque absorption by suitable guide surfaces, in contrast to known actuation devices, it is further possible to provide designs with a single and/or one individual thrust rod.

According to one aspect of the present disclosure, each support plate has a first slider element disposed in the area of each thrust element. It is understood that two slider elements can be disposed in the area of a thrust element without exceeding the scope of the present invention. The number and arrangement of the thrust and slider elements depends therefore, inter alia, particularly on the design of the injection molding apparatus, the molds and the actuation forces of the valve needles that are generated during the injection molding process.

In one embodiment of the actuation device, the slider mechanism has at least one thrust rod guide that is disposed on each of the at least one thrust rods serving to guide the thrust rod in the second direction. The thrust rod guide is particularly advantageously disposed on the side of the thrust rod that is opposite of the thrust elements. The thrust rod guide therein includes at least two guide surfaces that are sloped toward each other and by means of which forces and/or force components acting in the first direction, in the second direction and in a third direction, which is arranged transversely thereto, are transferrable, as well as torques that act upon the support plate. Advantageously, the guide can also be designed corresponding to the guide on the thrust elements.

In one embodiment of the actuation device, a slider mechanism has at least one second slider element that is disposed opposite the thrust rod guide that is disposed on the at least one thrust rod, and which has a second slider element guide disposed in the second direction with at least two guide surfaces that are sloped corresponding to the guide surfaces of the thrust rod guide. The thrust rod and the second slider element are movable relative to each other along the respective guide surfaces, so that the guide surfaces can absorb forces and/or force elements acting in the first direction and in the third direction, as well as torques that are in effect on the support plate. The at least one second slider element that is disposed opposite the at least one thrust rod is disposed on the injection molding apparatus, particularly as stationary, and the thrust rod is therefore movably disposed relative to the injection molding apparatus in the direction of the guide surfaces, respectively. Accordingly, the injection molding apparatus can absorb forces and/or torques that are in effect on the support plate via the sloped guide surfaces on the thrust rod and the second slider element.

In one embodiment of the actuation device, the at least two guide surfaces that are sloped toward each other are disposed substantially orthogonally relative to each other. With guide surfaces that are disposed approximately vertically relative to each other, it is possible to achieve a particularly favorable force distribution in the guide. However, regarding forces that are in effect in a known preferred direction, it is possible to configure the slopes of the guide surfaces accordingly, also consistent with the present requirements, in a different favorable manner, wherein, in such a case, a different arrangement of the sloped guide surfaces relative to each other, enclosing a different angle than a substantially orthogonal angle, can be beneficial.

In one embodiment of the actuation device, the thrust element guide and the first slider element guide and/or the thrust rod guide and the second slider element guide have four guide surfaces, respectively, wherein at least two guide surfaces are disposed as sloped relative to each other. In such an embodiment of an actuation device, the forces and torques acting on the support plate and valve needles can be particularly reliably absorbed, and precision-compromising clearance of the valve needle motion can be reduced.

In one embodiment of the actuation device, the slider mechanism includes at least two thrust rods that are connected to each other and disposed parallel relative to each other, particularly at a distance relative to the support plate. The at least two thrust rods that are connected to each other are disposed with the ability to move back and forth in a second direction that is at an angle relative to the first direction.

In one embodiment of the actuation device, roller bodies are disposed, respectively, between the guide surfaces of the thrust element guide, which are sloped toward each other, and the first slider element guide and/or between the guide surfaces of the thrust rod guide, which are sloped toward each other, and the second slider element guide. By disposing roller bodies between the guide surfaces, the risk of static friction is minimized, and friction is reduced, thereby facilitating improved adjusting action of the valve needles with reduced actuating forces. Reducing friction also reduces resistance to wear, allowing for achieving faster shutter times due to greater movement speeds.

In one embodiment of the actuation device with roller bodies, said roller bodies are disposed circumferentially in a groove disposed in a thrust element and/or in the first slider element. Simultaneously or optionally, the roller bodies can be disposed circumferentially in a groove disposed in the thrust element and/or in the second slider element. Circumferentially disposing the roller bodies offers the additional advantage of eliminating the need for precision-reducing clearance between the groove and the roller bodies. Optionally, it can be envisioned that the roller bodies move freely inside the groove, or that they are guided inside a cage.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter. Other objects, advantages and novel features of the present disclosure will become apparent from the following detailed description of one or more preferred embodiments when considered in conjunction with the accompanying drawings.

BRIEF DESCRIPTION OF THE DRAWINGS

The following is a description of the examples depicted in the accompanying drawings. The figures are not necessarily to scale, and certain features and certain views of the figures may be shown exaggerated in scale or in schematic in the interest of clarity or conciseness.

Figure 1:
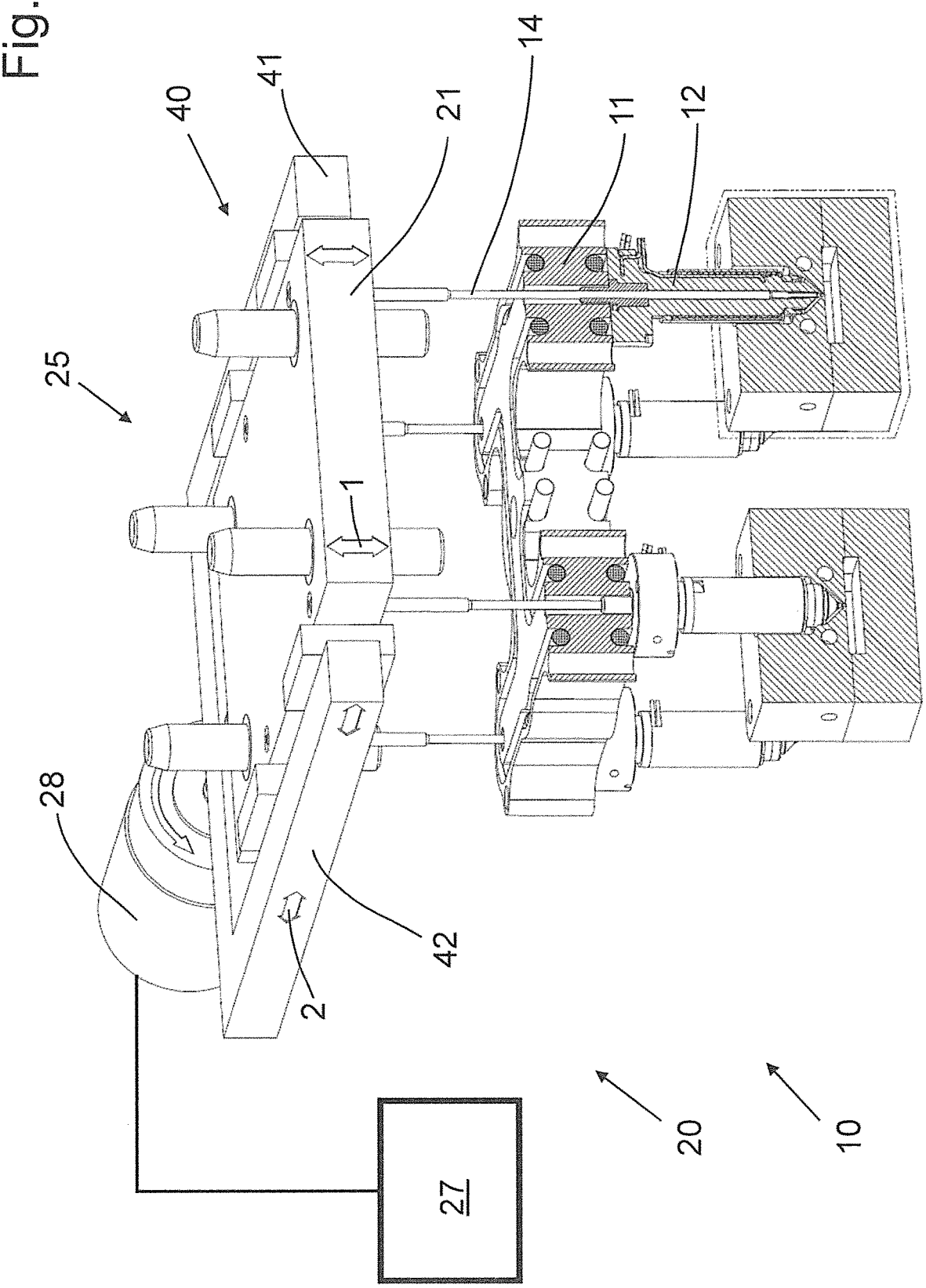
FIG. 1 shows a partial sectional view of a part of an injection molding apparatus with an embodiment of an actuation device according to the present disclosure.

The foregoing summary, as well as the following detailed description of certain inventive techniques, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION

In the following detailed description, specific details may be set forth in order to provide a thorough understanding of embodiments of the present disclosure. However, it will be clear to one skilled in the art when embodiments of the present disclosure may be practiced without some or all of these specific details. In other instances, well-known features or processes may not be described in detail so as not to unnecessarily obscure the present disclosure. In addition, like or identical reference numerals may be used to identify common or similar elements.

FIG. 1 shows an embodiment of an injection molding apparatus according to the present disclosure 10 with a hot runner manifold 11 that has disposed thereon, by way of an example, four hot runner nozzles 12 extending through which are the needles 14 by which the melt flow through the hot runner nozzle 12 is controllable. The injection molding apparatus 10 has an actuator device 20 with a support plate 21 that, in the present embodiment, is connected to four valve needles 14 and movable in a first direction 1, which is parallel to the actuation direction of the valve needles 14, relative to the hot runner manifold 11.

The actuating device 20 further includes a reciprocating device 25 for moving the support plate 21 in the first direction 1 relative to the hot runner manifold 11, wherein the reciprocating device 25 includes a slider mechanism 40 and an actuation drive 28 that is connected to the trigger device 27 for generating linear movement.

The exemplary sliding mechanism 40 of the actuating device 20 includes a first thrust rod 41 and at least one second thrust rod 42 that is connected thereto, with the rods being disposed parallel relative to each other and having the capability of moving back and forth in direction 2 that is at an angle relative to the first direction 1.

Figure 2:
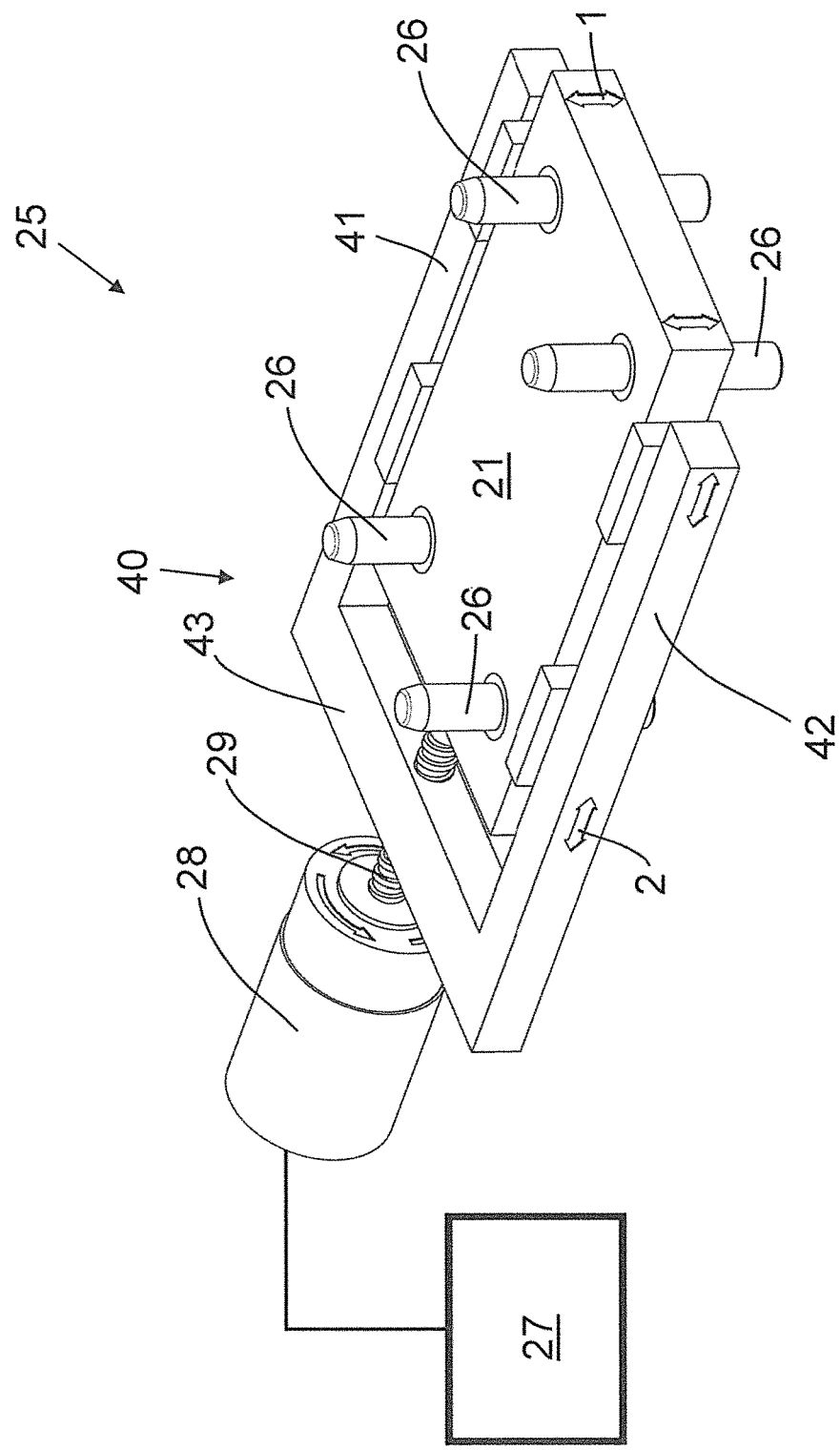
FIG. 2 shows a further representation of the embodiment of the reciprocating apparatus shown in FIG. 1 for moving the support plate.

FIG. 2 shows the embodiment of the reciprocating device 25 as shown in FIG. 1 for moving the support plate 21, as seen in a further representation. It can be clearly seen that the support plate 21 in the embodiment is guided on four column guides 26 that allow the support plate 21 to move in the first direction 1 for actuating the valve needles 14 (not shown in FIG. 2).

To move the support plate 21 in the first direction 1, the reciprocating device 25 has an actuating drive 28 whose actuating element 29, as seen in the embodiment, is movable back and forth in a second direction 2 relative to the support plate 21, which is at a 90-degree angle relative to the direction of actuation of the valve needles 14.

The actuating element 29 has a drive connection with the slider mechanism 40, which includes a first thrust rod and a second thrust rod 41, 42. A rigid cross bar 43 fixedly connects the thrust rods 41, 42 of the embodiment. The actuation drive 28 is connected to the cross bar 43 by the actuating element 29, whereby the thrust rods 41, 42 are adjustable in the second direction by means of the actuating drive, via the cross bar 43 and the actuating element 29.

Figure 3:
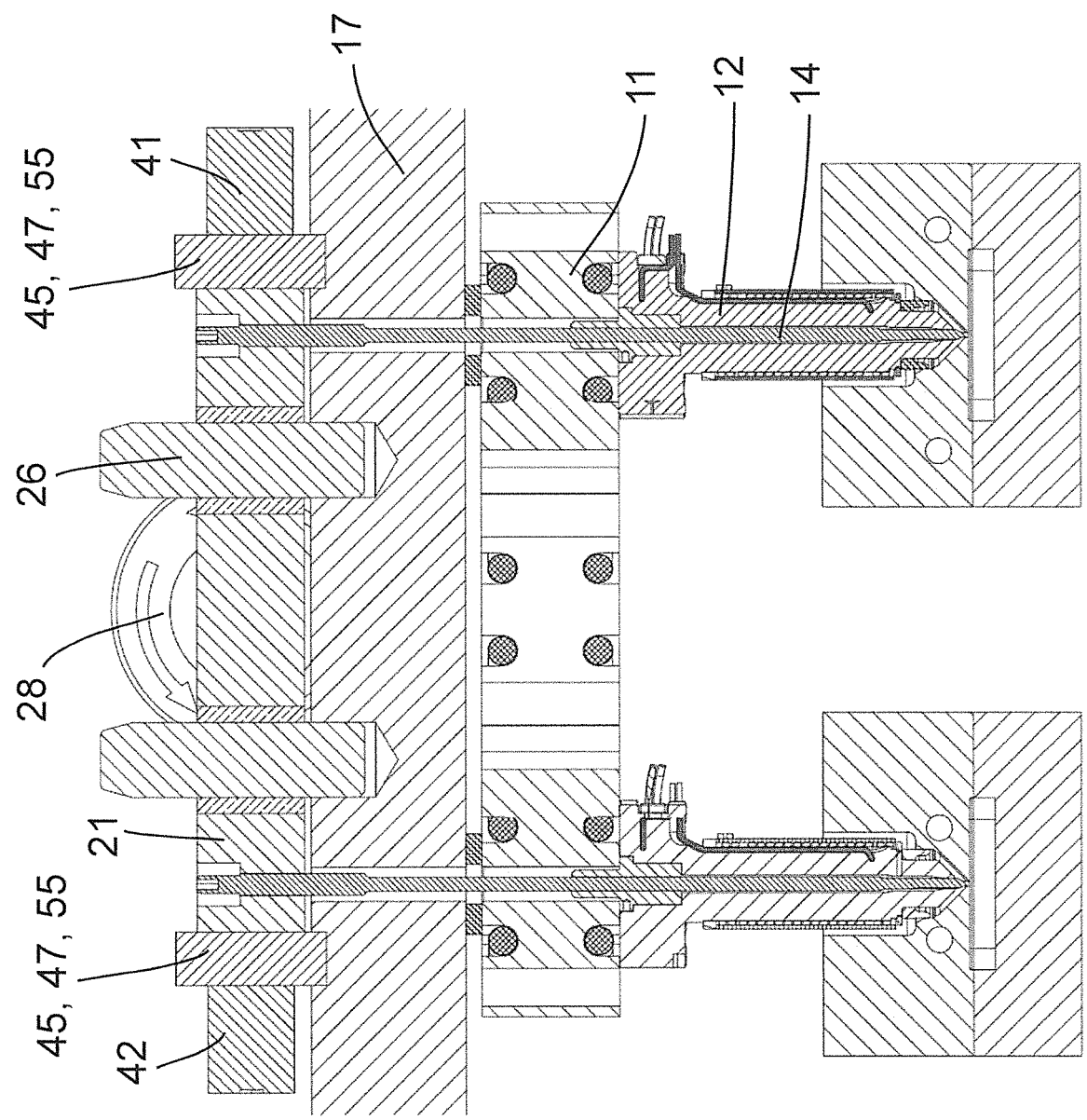
FIG. 3 shows a sectional representation through the embodiment of the actuation device according to FIG. 1.

FIG. 3 shows a sectional representation through the embodiment of the actuation device 20 from FIG. 1. FIG. 3 depicts the stationary mold plate 17 of the injection molding apparatus 10 to which the hot runner manifold 11 is fixedly connected. FIG. 3 demonstrates also the compactness of the proposed design of an actuating device 20. Further shown is the arrangement of the valve needles 14, the fastening thereof to the support plate 21 and the actuating drive 28. The thrust rods 41, 42 and the thrust and/or slider elements 45, 47, 55 of the slider mechanism 40 that are disposed between the former and the support plate 21 are only shown schematically.

Figure 4:
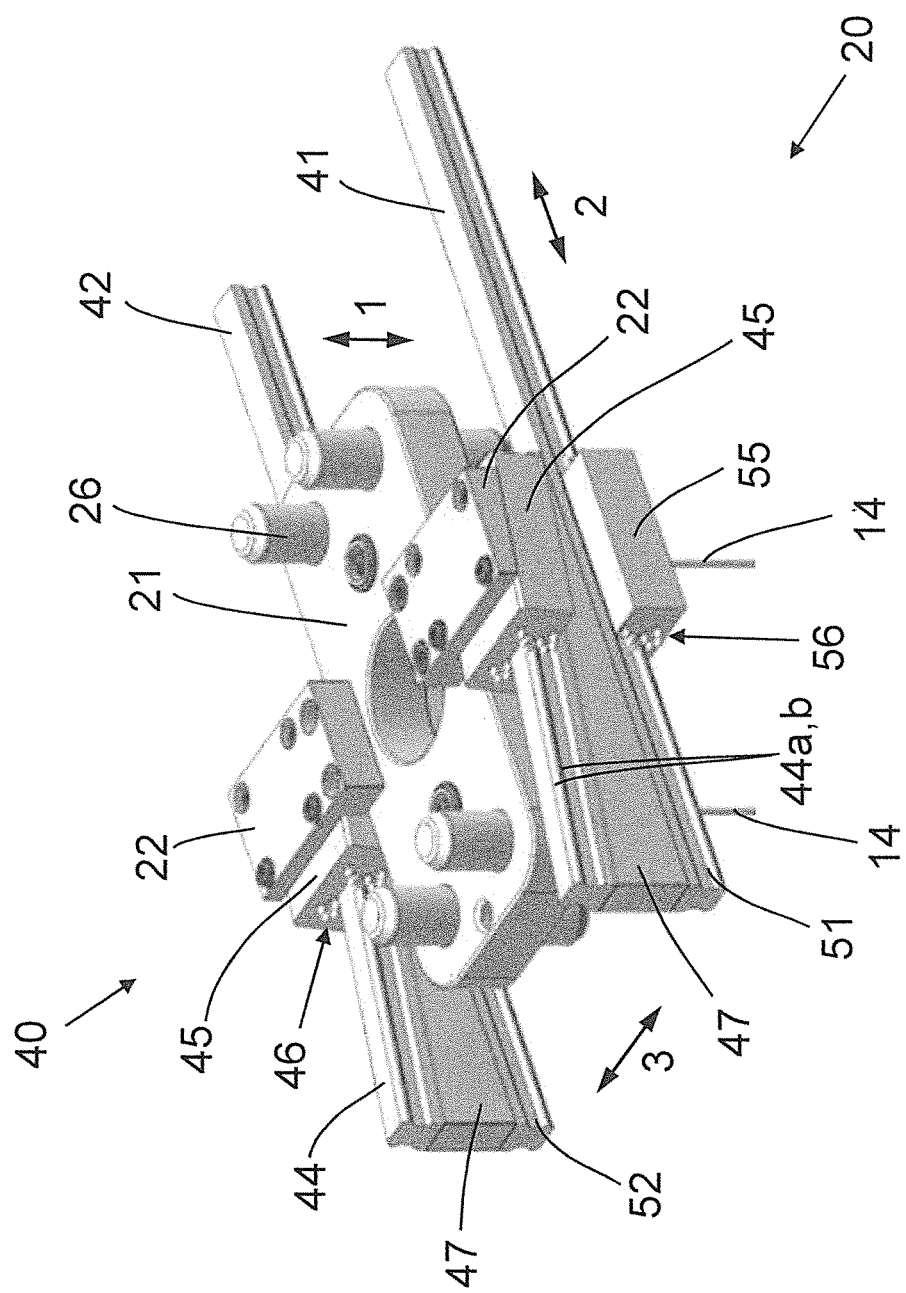
FIG. 4 shows a detailed three-dimensional representation of a further embodiment of an actuation device according to the present disclosure.

FIG. 4 shows a detailed three-dimensional representation of a further embodiment according to the present disclosure of an actuation device 20. The support plate 21 is depicted in the center of the representation; it is guided on four column guides 26 in the first direction 1 for actuating the valve needles 14. The thrust rods 41, 42 of the slider mechanism 40 are disposed in this embodiment on both sides of the support plate 21. Each of the thrust rods 41, 42 has a thrust element 47 with a thrust element guide 44 that is disposed at an angle relative to the second direction 2, wherein the thrust element guide 44 has at least two sloped guide surfaces 44a, 44b, which will be addressed in further detail below in the remarks concerning FIG. 5. A first slider element 45 with a first slider element guide 46 is disposed on the support plate 21 in the area of each thrust element 47 and fixedly fastened to the support plate 21 by a holding element 22. Each thrust element 47 operates in conjunction with a first slider element 45, whereby a movement of the thrust rods 41, 42 in the second direction 2 moves the support plate 21 in the first direction 1.

A thrust rod guide 51, 52 is also disposed on each push rod 41, 42 serving to guide the thrust rod 41, 42 in the second direction 2. The slider mechanism 40 of the embodiment includes, respectively opposite the thrust rods 51, 52, a second slider element 55 with a second slider element guide 56 disposed in the second direction and having at least two sloped guide surfaces 56a, 56b, as described in further detail below in the remarks concerning FIG. 5.

Figure 5:
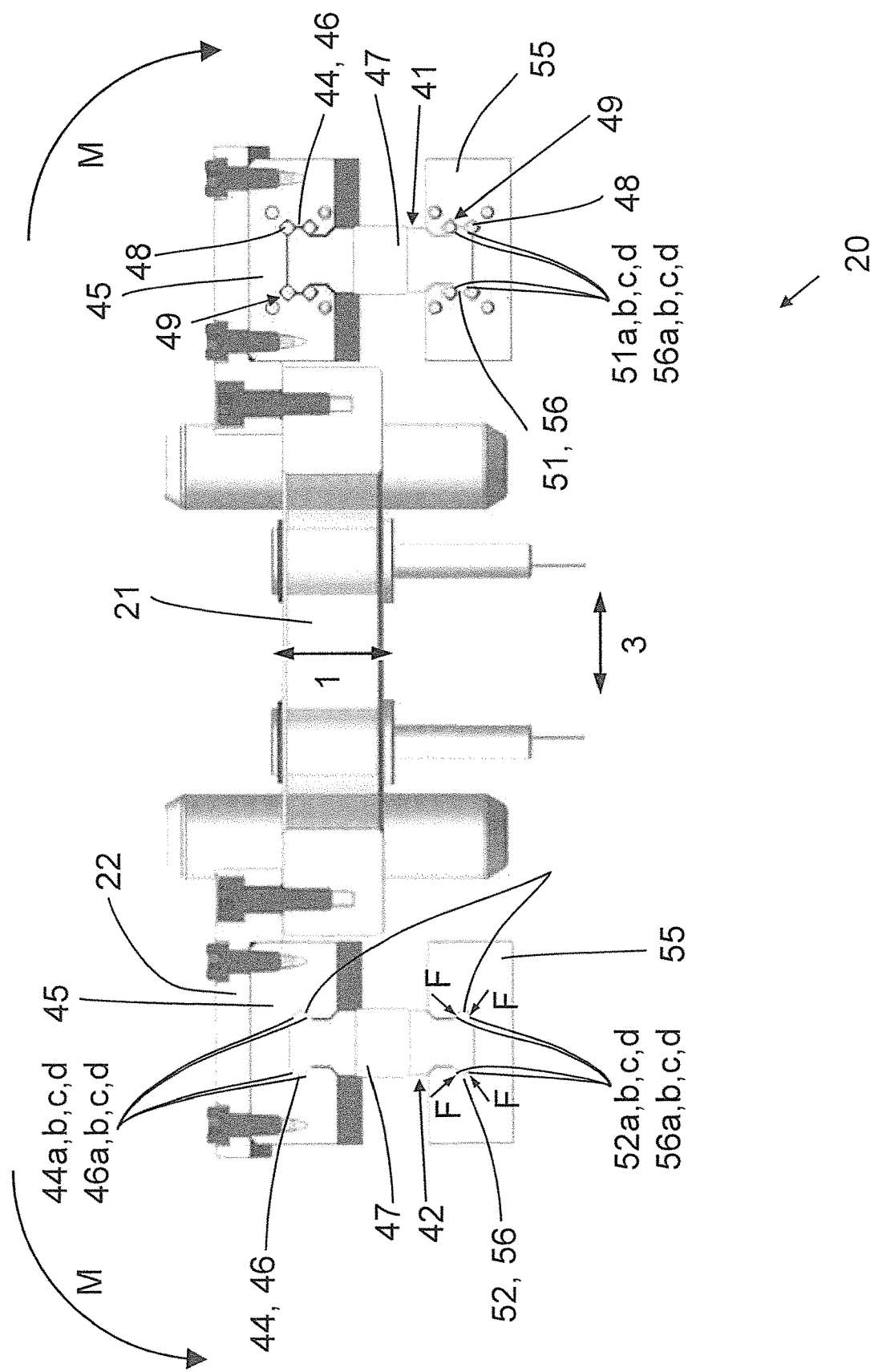
FIG. 5 shows a partial sectional view of an embodiment of an actuation device according to FIG. 4.

FIG. 5 shows a partial sectional view of an embodiment of an actuating device 20 according to the present disclosure as seen in FIG. 4. The thrust element 47 includes a thrust element guide 44 that is disposed at an angle relative to the second direction 2 having at least two, more precisely four, sloped guide surfaces 44a, 44b, 44c, 44d. All guides of the actuating device as shown in the embodiment according to the present disclosure have two, more precisely four sloped guide surfaces. This allows for further, more precise guide action of the thrust rods 41, 42, thrust elements 47 and slider elements 45, 55. The first slider element 45 is disposed on the thrust element 47 and has a first slider element guide 46, which is disposed, corresponding to the thrust element guide 44, at an angle relative to the second direction 2 and includes four sloped guide surfaces 46a, 46b, 46c, 46d, corresponding to the thrust element guide 44. The thrust element 47 and the first slider element 45 are movable relative to each other in a sliding motion alongside these guide surfaces 44a, 44b, 44c, 44d and 46a, 46b, 46c, 46d. The slope of the guide surfaces 44a, 44b, 44c, 44d and 46a, 46b, 46c, 46d is configured such that the forces that are in effect in the first direction 1 and in the third direction 3, as well as torques that are in effect on the support plate 21 are transferrable via the respective guides.

As shown in FIG. 5, a thrust rod guide 52 is disposed on the thrust rod 42 and has four sloped guide surfaces 52a, 52b, 52c, 52d. The second thrust element 55 is disposed on the thrust rod 42 and has a second slider element guide 56, which has guide surfaces 56a, 56b, 56c, 56d sloped corresponding to thrust rod guide 52. The shown configuration enables absorbing the forces F that are in effect in the first direction 1 and third direction 3 as well as the torques M that are in effect on the support plate 21 via the guide surfaces 52a, 52b, 52c, 52d and 56a, 56b, 56c, 56d. In the depicted embodiment, the guide surfaces 44a, 44b, 44c, 44d and 46a, 46b, 46c, 46d of the thrust element 47 and the first slider element 45, which are sloped toward each other, are disposed, similarly to the guide surfaces 52a, 52b, 52c, 52d and 56a, 56b, 56c, 56d of the thrust rods 41, 42 and the second slider element 55, which are sloped toward each other, substantially orthogonally relative to each other.

In the embodiment shown in FIG. 5, the thrust element, thrust rods and slider element guides 44, 46 and 52, 56 each have four guide surfaces 44a, 44b, 44c, 44d, 46a, 46b, 46c, 46d and 52a, 52b, 52c, 52d and 56a, 56b, 56c, 56d. At least two guide surfaces 44a, 44b, 44c, 44d, 46a, 46b, 46c, 46d, 52a, 52b, 52c, 52d and 56a, 56b, 56c, 56d are disposed as sloped toward each other. On the left side of the representation, the forces F that are in effect on the guide surfaces 52a, 52b, 52c, 52d and 56a, 56b, 56c, 56d are shown in an exemplary manner, having force components that are in effect in the first direction 1 and the third direction 3. The guides 52 and 56 can thereby also absorb torque M, which is also in effect on the support plate 21. Such torques can cause distortion of the support plate 21, thereby compromising the precision of the opening and closing motions of the valve needle 14.

FIG. 5 shows different configurations of the guides 44, 46, 51, 52, 56 that are disposed on the slider and thrust elements 45, 55, 47 and on the thrust rods 41, 42. In the configuration concerning the slider mechanism 40, as depicted in FIG. 5, the guides 44, 46 and 52, 56 have guide surfaces 44a, 44b, 44c, 44d, 46a, 46b, 46c, 46d and/or 52a, 52b, 52c, 52d, 56a, 56b, 56c, 56d that glide on top of each other. In the configuration concerning the slider mechanism 40, as seen on the right side, the guides 44, 46 and 51, 56 have roller bodies 48 that are disposed between the guide surfaces 44a, 44b, 44c, 44d, 46a, 46b, 46c, 46d and/or 51a, 51b, 51c, 51d, 56a, 56b, 56c, 56d, which are disposed in circumferential grooves 49 of the slider elements 45, 55.

Some of the elements described herein are identified explicitly as being optional, while other elements are not identified in this way. Even if not identified as such, it will be noted that, in some embodiments, some of these other elements are not intended to be interpreted as being necessary, and would be understood by one skilled in the art as being optional.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An actuating device for adjusting at least one valve needle of an injection molding apparatus with a hot runner manifold that has disposed thereon at least one hot runner nozzle with at least one valve needle that extends therethrough and by which the flow of a melt through the hot runner nozzle is controllable, including
a support plate that is connected to at least one valve needle that is movable back and forth relative to the hot runner manifold in a first direction parallel to the actuation direction of the valve needles, and
a reciprocating device for moving the support plate in the first direction relative to the hot runner manifold,
wherein the reciprocating device includes a slider mechanism and an actuation drive that is connected to a trigger device for generating linear movement,
wherein the slider mechanism includes at least one thrust rod that is disposed, relative to the first direction, in an angled second direction and movable back and forth in the second direction,
wherein the at least one thrust rod has at least one thrust element, and wherein the at least one thrust element connects to a thrust element guide that is disposed at an angle relative to the second direction,
wherein the thrust element guide has at least two sloped guide surfaces,
wherein on the support plate, in the area of each thrust element, there is disposed a first slider element with a first slider element guide, which is disposed at an angle, corresponding to the thrust element guide, relative to the second direction, and having at least two sloped guide surfaces according to the thrust element guide, and wherein the first slider element is fixedly fastened to the support plate,
wherein the thrust element and the first slider element are movable relative to each other along the respective guide surfaces, and the slope of the guide surfaces is configured to at least partially absorb forces by the sloped guide surfaces that are in effect in the first direction and a third direction, which is transverse to the first direction and second direction, and the torques that are in effect on the support plate by the respective guide, and
wherein one thrust element, respectively, acts in conjunction with the first slider element, whereby a movement of the thrust rod in the second direction moves the support plate in the first direction.

2. The actuating device according to claim 1, wherein the slider mechanism has at least one thrust rod guide disposed on the at least one thrust rod that serve to guide the thrust rod in the second direction.

3. The actuating device according to claim 2, wherein the thrust rod guide has at least two guide surfaces that are sloped toward each other and by which forces that are in effect in the first direction and in the third direction as well as torques that are in effect on the support plate are transferable.

4. The actuating device according to claim 3, wherein the slider mechanism has at least one second slider element, respectively, that is disposed opposite the thrust rod guide, which is disposed on the at least one thrust rod, with a second slider element guide that is disposed in the second direction having at least two sloped guide surfaces, corresponding to the guide surfaces of the thrust rod guide, wherein the thrust rod and the second slider element are movable relative to each other along the respective guide surfaces, wherein forces that are in effect via the guide in the first direction and in the third direction, as well as torques that are in effect on the support plate, are transferable.

5. The actuating device according to claim 1, wherein the at least two guide surfaces that are sloped toward each other are disposed relative to each other substantially orthogonally.

6. The actuating device according to claim 1, wherein at least either the thrust element guide and the first slider element guide each have four guide surfaces or the thrust rod guide and the second slider element guide each have four guide surfaces, wherein at least two guide surfaces each are disposed sloping toward each other.

7. The actuating device according to claim 1, wherein the slider mechanism has at least two thrust rods, which are connected to each other and disposed parallel relative to each other.

8. The actuating device according to claim 1, wherein a roller body is disposed either at least between the guide surfaces that are sloped toward each other of the thrust element guide and the first slider element guide or between the guide surfaces that are sloped toward each other of the thrust rod guide and the second slider element guide.

9. The actuating device according to claim 8, wherein the roller body is disposed circumferentially in a groove disposed in the first slider element.

10. The actuating device according to claim 8, wherein the roller body is disposed circumferentially in a groove disposed in the second slider element.

11. The actuating device according to claim 6, wherein all of the thrust element guide, the first slider element guide, the thrust rod guide, and the second slider element guide each have four guide surfaces.

12. The actuating device according to claim 1, wherein a roller body is disposed both between the guide surfaces that are sloped toward each other of the thrust element guide and the first slider element guide and between the guide surfaces that are sloped toward each other of the thrust rod guide and the second slider element guide.

13. The actuating device according to claim 12, wherein the roller body is disposed circumferentially in a groove disposed in the first slider element.

14. The actuating device according to claim 12, wherein the roller body is disposed circumferentially in a groove disposed in the second slider element.

* * * * *